(12) United States Patent
Kim

(10) Patent No.: US 12,090,891 B2
(45) Date of Patent: Sep. 17, 2024

(54) APPARATUS AND METHOD FOR CONTROLLING ELECTRO-MECHANICAL BRAKE

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 413 days.

(21) Appl. No.: 17/554,615

(22) Filed: Dec. 17, 2021

(65) Prior Publication Data

US 2022/0219545 A1 Jul. 14, 2022

(30) Foreign Application Priority Data

Jan. 12, 2021 (KR) .......................... 10-2021-0004168

(51) Int. Cl.
*B60L 7/26* (2006.01)
*B60L 15/20* (2006.01)
(Continued)

(52) U.S. Cl.
CPC ............. *B60L 7/26* (2013.01); *B60L 15/2009* (2013.01); *B60T 8/172* (2013.01); *B60T 8/1761* (2013.01); *B60L 2240/423* (2013.01)

(58) Field of Classification Search
None
See application file for complete search history.

(56) References Cited

U.S. PATENT DOCUMENTS

| 6,317,675 | B1 | 11/2001 | Stolzl et al. | |
|---|---|---|---|---|
| 6,345,225 | B1 * | 2/2002 | Bohm | B60T 8/321 701/72 |

(Continued)

FOREIGN PATENT DOCUMENTS

| CN | 102785648 A | 11/2012 |
|---|---|---|
| CN | 109664868 A | 4/2019 |

(Continued)

OTHER PUBLICATIONS

German Office Action issued Aug. 5, 2022 in corresponding German Patent Application No. 102021134307.0.

(Continued)

*Primary Examiner* — Melanie Torres Williams
(74) *Attorney, Agent, or Firm* — NovoTechIP International PLLC

(57) ABSTRACT

The present disclosure in some embodiments provides an apparatus for controlling a plurality of EMBs configured to control, using a motor, braking of a vehicle, the apparatus comprising: a plurality of WCUs configured to control the motor to cause the plurality of EMBs to generate a plurality of braking forces corresponding to a plurality of braking signals, respectively; a center ECU configured to transmit the plurality of braking signals to the plurality of WCUs; and a plurality of bus lines comprising first and second bus lines and extending between the center ECU and the plurality of WCUs, wherein the center ECU is further configured to: transmit, via the first bus line, at least one of the plurality of braking signals to at least one of the plurality of WCUs; and transmit, via the second bus line, the other braking signal or signals to the other WCU or WCUs.

9 Claims, 3 Drawing Sheets

(51) Int. Cl.
    *B60T 8/172*     (2006.01)
    *B60T 8/1761*     (2006.01)

(56) References Cited

U.S. PATENT DOCUMENTS

| | | | |
|---|---|---|---|
| 6,476,515 | B1 | 11/2002 | Yamamoto et al. |
| 6,749,269 | B1 | 6/2004 | Niwa |
| 2004/0200648 | A1* | 10/2004 | Tarasinski ................. B60L 7/08 180/65.7 |
| 2010/0007199 | A1 | 1/2010 | Kim |
| 2011/0320099 | A1 | 12/2011 | Kim |

FOREIGN PATENT DOCUMENTS

| | | |
|---|---|---|
| CN | 211364532 U | 8/2020 |
| EP | 3318457 A1 | 5/2018 |
| EP | 3318458 A1 | 5/2018 |
| EP | 3318459 A1 | 5/2018 |
| WO | 9926821 A1 | 6/1999 |

OTHER PUBLICATIONS

Office Action issued Dec. 13, 2023 in corresponding Chinese Patent Application No. 202111609247.X.
Office Action issued May 20, 2023 in corresponding Chinese Patent Application No. 202111609247.X.

* cited by examiner

APPARATUS AND METHOD FOR CONTROLLING ELECTRO-MECHANICAL BRAKE

CROSS-REFERENCE TO RELATED APPLICATIONS

This application claims priority to and the benefit of Korean Patent Application No. 10-2021-0004168, filed on Jan. 12, 2021, the disclosure of which is incorporated herein by reference in its entirety.

BACKGROUND OF THE INVENTION

1. Field of the Invention

The present disclosure relates to an apparatus and a method for controlling an electro-mechanical brake.

2. Discussion of Related Art

The contents described herein provide only background information and do not constitute the related art.

In a situation in which a vehicle slipping phenomenon occurs, when optimum braking is not performed according to a traveling state of a vehicle and a condition of a ground surface, risk of an accident may be greater. Accordingly, an electro-mechanical brake (EMB), which may be precisely controlled when compared to a hydraulic brake and allow a structure of an overall brake system to be simplified, is being developed.

An EMB is an apparatus in which an actuator driven by a motor is installed on a caliper and directly brakes a vehicle using a driving force of the motor without a medium such as a brake fluid. In this case, a center electronic control unit (ECU) is configured to transmit a command signal related to braking of a WCU installed in the actuator of each of wheels, and the signal is exchanged between the center ECU and the WCU using controller area network (CAN).

Using the EMB, a conventional brake system (CBS), an anti-lock brake system (ABS), electronic stability control (ESC), and the like may be realized. Particularly, the ABS is configured to prevent a vehicle slipping phenomenon by quickly and automatically adjusting a braking pressure applied to a wheel of a vehicle according to a slip ratio calculated from a travel state of the vehicle.

However, when vehicle braking is controlled using the conventional CAN communication, and when a decrease and an increase in braking force are repeatedly required as in the ABS, signal delay may occur. Although the center ECU and the WCU may be connected using a wire without using the CAN communication, in this case, there are problems in that a size and complexity of an overall brake system are increased, and manufacturing costs are also increased.

BRIEF SUMMARY OF THE INVENTION

The present disclosure is directed to providing a control apparatus of an electro-mechanical brake, which is capable of securing stability of vehicle braking control including anti-lock brake system (ABS) control by solving a signal delay problem while using conventional controller area network (CAN) communication, and a method of controlling the same.

According to at least one embodiment, the present disclosure provides an apparatus for controlling a plurality of electro-mechanical brakes (EMBs) configured to control, using a motor, braking of front wheels and rear wheels of a vehicle, the apparatus comprising: a plurality of wheel control units (WCUs) configured to control the motor to cause the plurality of EMBs to generate a plurality of braking forces corresponding to a plurality of braking signals, respectively; a center electronic control unit (ECU) configured to transmit the plurality of braking signals to the plurality of WCUs; and a plurality of bus lines comprising first and second bus lines and extending between the center ECU and the plurality of WCUs, wherein the center ECU is further configured to: transmit, via the first bus line, at least one of the plurality of braking signals to at least one of the plurality of WCUs; and transmit, via the second bus line, the other braking signal or signals to the other WCU or WCUs.

Another embodiment of the present disclosure provides a method performed by a center electric control unit (ECU) electrically connected to a plurality of wheel control units (WCUs) via a plurality of bus lines, the plurality WCUs configured to control a plurality of electro-mechanical brakes (EMBs) configured to control braking of front and rear wheels of a vehicle, the method comprising: calculating a slip ratio of each of the front and rear wheels; generating, based on the slip ratio of each of the front and rear wheels, a plurality of braking signals configured to control the plurality of EMBs; and transmitting, via the plurality of bus lines, the plurality of braking signals to the plurality of WCUs, wherein the plurality of bus lines comprises first and second bus lines, and at least one of the plurality of braking signals is transmitted via the first bus line, and the other braking signal or signals are transmitted via the second bus line.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
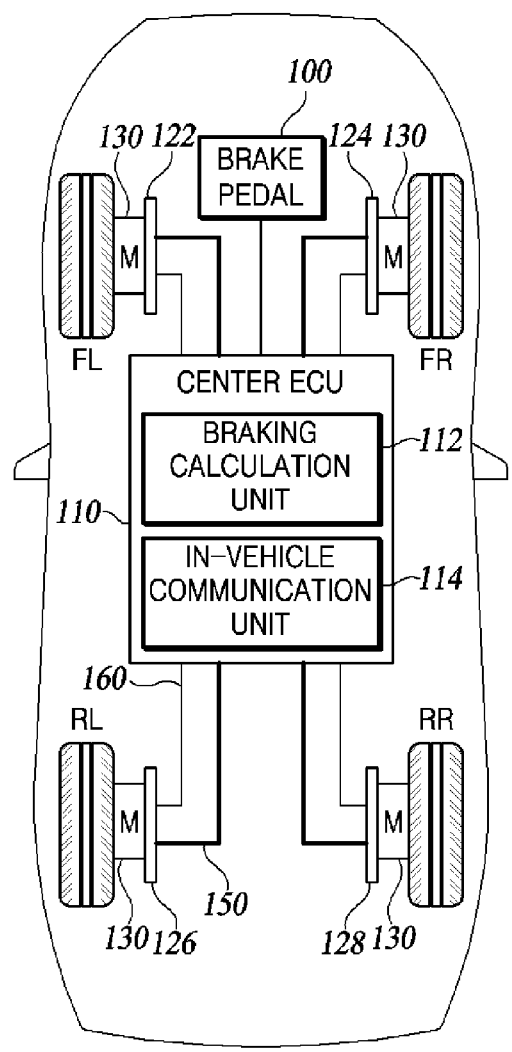
FIG. 1 is a view illustrating a configuration of a control apparatus of an electro-mechanical brake (EMB) according to one embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a view illustrating a configuration of a control apparatus of an electro-mechanical brake (EMB) according to one embodiment of the present disclosure.

Figure 2:
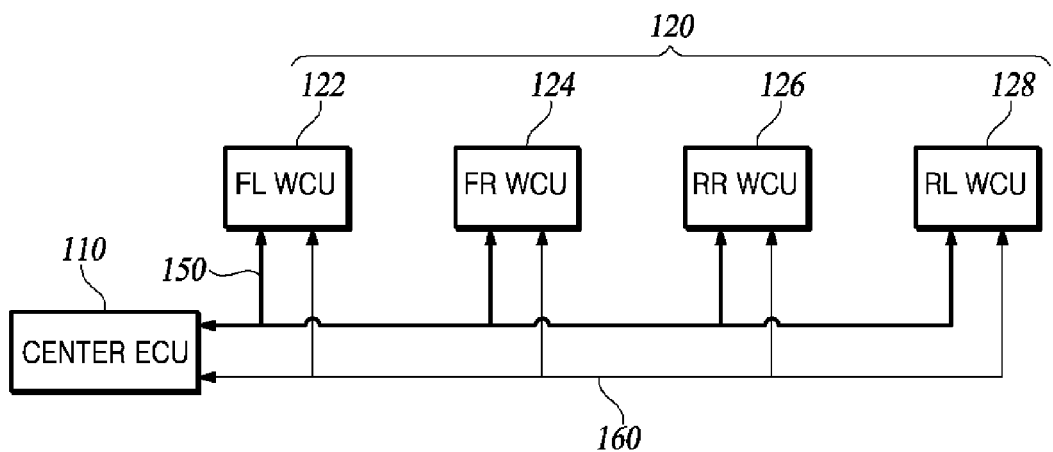
FIG. 2 is a view illustrating a first bus line and a second bus line of a controller area network (CAN) communication module according to one embodiment of the present disclosure.

FIG. 2 is a view illustrating a first bus line and a second bus line of a controller area network (CAN) communication module according to one embodiment of the present disclosure.

Referring to FIGS. 1 and 2, a control apparatus of an EMB according to one embodiment of the present disclosure may include all or some of a brake pedal 100, a center electronic control unit (ECU) 110, wheel control units (WCUs) 120, motors 130, a first bus line 150, and a second bus line 160. Meanwhile, the EMB may be provided as four EMBs corresponding to wheels of a vehicle and configured to brake front wheels and rear wheels of the vehicle using the motor 130.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

The brake pedal 100 is an apparatus used when a user tries to decrease a speed of the vehicle or to stop the vehicle and is disposed at a driver side of the vehicle to be pressed using a user's body, for example, the foot. In addition, a stroke sensor (not shown) configured to detect a stroke amount of the brake pedal 100 when the driver presses the brake pedal 100 may be installed on the brake pedal 100.

The center ECU 110 is configured to transmit braking signals to the plurality of WCUs 120. In addition, the center ECU 110 may be configured to calculate a slip ratio of the front wheel and a slip ratio of the rear wheel of the vehicle. Accordingly, the center ECU 110 may be electrically connected to a wheel speed sensor (not shown) installed in the wheel. The wheel speed sensor may detect a rotational speed of the wheel, and the rotational speed, which is detected by the wheel speed sensor, of the wheel is transmitted to the center ECU 110. In addition, the center ECU 110 may be electrically connected to the stroke sensor, and in this case, a stroke amount, which is detected by the stroke sensor, of the brake pedal 100 may be transmitted to the center ECU 110.

The center ECU 110 may include a braking calculation unit 112 in order to calculate the slip ratio and a braking force. The slip ratio may be calculated using a speed of the vehicle and a rotational speed of the wheel, and a method of calculating the slip ratio is well known as a known technology. The braking calculation unit 112 may calculate the braking force required for each of the wheels on the basis of the slip ratio calculated for each wheel.

For example, when it is determined that a wheel lock phenomenon, which is a phenomenon in which the wheel stops rotation, occurs at one or more of the wheels as a result of calculating slip ratios, the braking calculation unit 112 may repeatedly calculate a braking force to repeatedly decrease and increase the braking force of the wheel in order to realize an anti-lock brake system (ABS).

Meanwhile, the center ECU 110 may include an in-vehicle communication unit 114 in order to transmit the braking signals to the plurality of WCUs 120. The in-vehicle communication unit 114 is configured to transmit the braking signals corresponding to the braking forces calculated by the braking calculation unit 112 to the plurality of WCUs 120. In addition, the center ECU 110 may receive a rotational speed of the wheel from the wheel speed sensor using the in-vehicle communication unit 114. The in-vehicle communication unit 114 may be formed using, for example, controller area network (CAN) communication.

In this case, the braking signal may include an increase signal to increase the braking force of the EMB and/or a decrease signal to decrease the braking force of the EMB.

The WCU 120 controls the motors 130 so that the plurality of EMBs generate the braking forces corresponding to the braking signals. Accordingly, the WCU 120 may be included in or installed on the motor 130.

In addition, the WCUs 120 include a front left (FL) WCU 122, a front right (FR) WCU 124, a rear right (RR) WCU 126, and a rear left (RL) WCU 128. That is, a front WCU (not shown) includes the FL WCU 122 and the FR WCU 124, and a rear WCU (not shown) includes the RR WCU 126 and the RL WCU 128.

The motor 130 rotates in a forward or reverse direction to generate a rotational force according to control of the WCU 120. The rotational force generated by the motor 130 is transmitted to a gear box (not shown), and the gear box, which receives the rotational force, is configured so that a spindle (not shown) moves linearly.

When the spindle of the gear box moves linearly, a piston (not shown) attached to one end of a caliper body (not shown) moves forward or rearward, and accordingly, the brake pad (not shown) connected to the piston pressurizes a disc (not shown) to generate a braking force. In the present disclosure, since a structure related to driving of the motor 130 and the gear box are well known technology to those skilled in the art, drawings and detailed descriptions related thereto will be omitted.

The first bus line 150 may electrically connect the plurality of WCUs 120 and the center ECU 110 and may serve to transmit a first braking signal 350 (see FIG. 3) to at least one of the WCUs. In this case, the first braking signal 350 is a braking signal transmitted thereto using the first bus line 150.

The second bus line 160 may electrically connect the plurality of WCUs 120 and the center ECU 110 and may serve to transmit a second braking signal 360 (see FIG. 3) to the remaining WCUs excluding the WCU which receives the first braking signal 350. In this case, the second braking signal 360 is a braking signal transmitted thereto using the second bus line 160.

That is, both of the first bus line 150 and the second bus line 160 may electrically connect the plurality of WCUs 120 and the center ECU 110 and may transmit the braking signals in parallel. Accordingly, the center ECU 110 may transmit the braking signals to at least some of the plurality of WCUs 120 and the remaining WCUs 120 using different bus lines.

A control apparatus of a conventional EMB is configured to transmit a braking signal using a first bus line 150 and configured to transmit a braking signal using the second bus line 160 when the first bus line 150 fails. The control apparatus of the EMB of the present disclosure is configured to transmit the braking signals using the first bus line 150 and the second bus line 160 at the same time or at different times without additionally including a separate bus line and is not necessarily limited such that the braking signal is transmitted through the second bus line 160 only when the first bus line 150 fails. That is, the conventional EMB also includes two bus lines for realizing redundancy, but in the present disclosure, redundancy may also be realized, and since two bus lines are used at normal times, the braking signals may be transmitted more quickly.

Figure 3A:
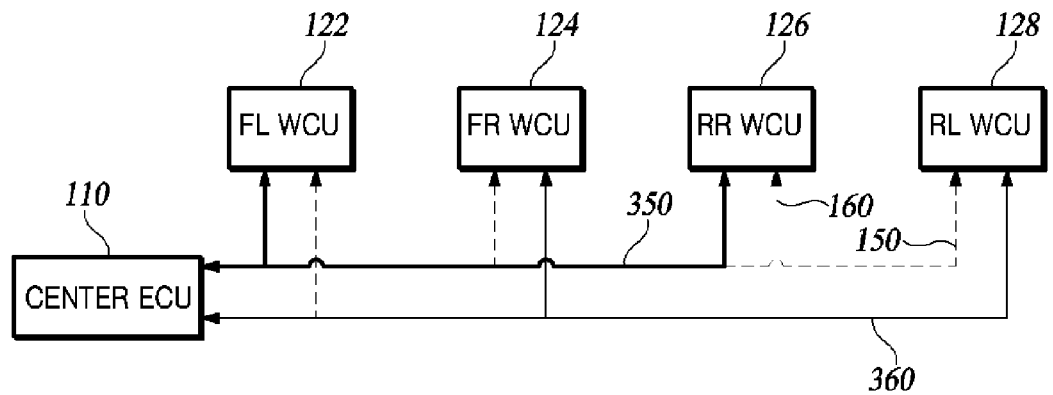
FIGS. 3A, 3B and 3C are views showing an example of first and second braking signals being transmitted according to one embodiment of the present disclosure.
Figure 3B:
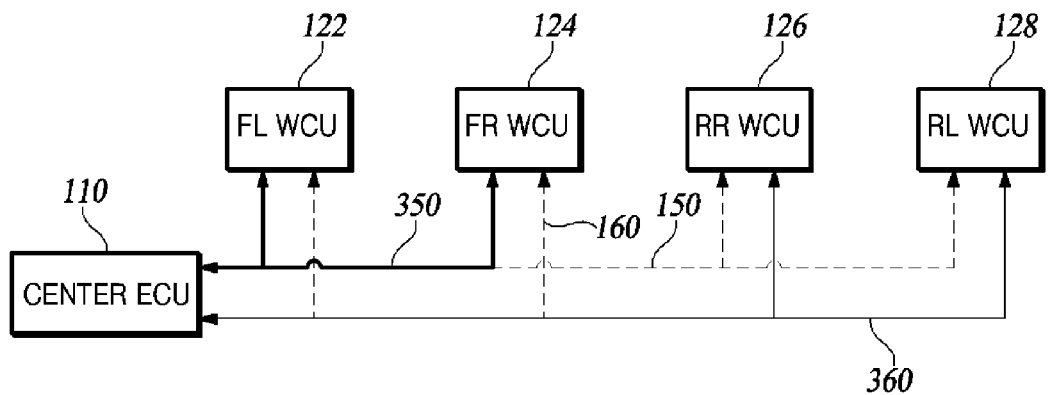
Figure 3C:
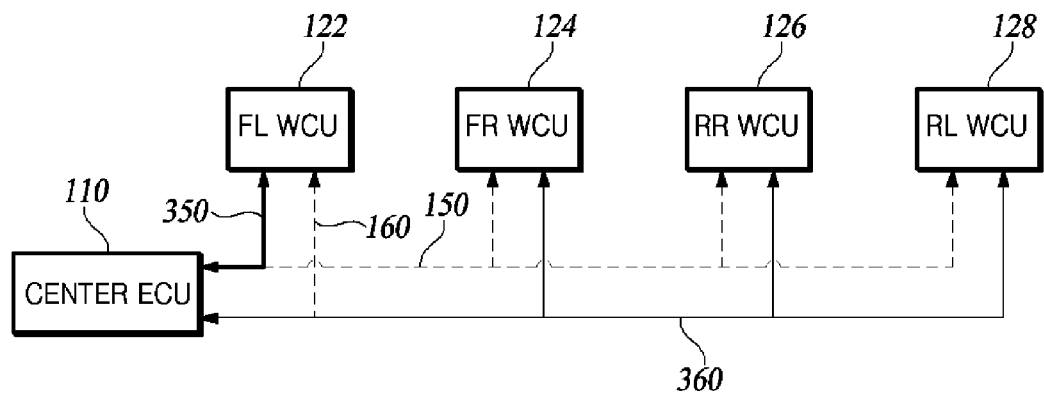

FIGS. 3A, 3B and 3C are views showing an example of first and second braking signals being transmitted according to one embodiment of the present disclosure.

Referring to FIG. 3A, each of the first braking signal 350 and the second braking signal 360 may be transmitted to one WCU among the front WCUs 122 and 124 and one WCU among the rear WCUs 126 and 128.

In this case, the center ECU 110 may transmit the first braking signal 350 to one front WCU and one rear WCU among the plurality of WCUs 120 using the first bus line 150. In addition, the center ECU 110 may transmit the second braking signal 360 to the other front WCU and the other rear WCU among the plurality of WCUs 120 using the second bus line 160.

That is, as illustrated in FIG. 3A, the first braking signal 350 may be transmitted to the FL WCU 122 and the RR WCU 126, and the second braking signal 360 may be transmitted to the FR WCU 124 and the RL WCU 128. However, as long as the first braking signal 350 is transmitted to one of the FL WCU 122 and the FR WCU 124 and one of the RL WCU 128 and the RR WCU 126 and the second braking signal 360 is transmitted to the remaining WCUs excluding the WCUs to which the first braking signal 350 is transmitted, the present disclosure is not necessarily limited to the transmission method as in FIG. 3A.

Referring to FIG. 3B, the first braking signal 350 may be transmitted to the front WCUs 122 and 124 corresponding to the front wheels of the vehicle, and the second braking signal 360 may be transmitted to the rear WCUs 126a and 128 corresponding to the rear wheels of the vehicle.

In this case, the center ECU 110 may transmit the first braking signal 350 to the front WCUs 122 and 124 among the plurality of WCUs 120 using the first bus line 150 and may transmit the second braking signal 360 to the rear WCUs 126 and 128 among the plurality of WCUs 120 using the second bus line 160.

That is, as illustrated in FIG. 3B, the first braking signal 350 may be transmitted to the FL WCU 122 and the FR WCU 124, and the second braking signal 360 may be transmitted to the RR WCU 126 and the RL WCU 128.

As in FIGS. 3A and 3B, since each of the first braking signal 350 and the second braking signal 360 is transmitted to two WCUs among the WCUs 122, 124, 126, and 128, a transmission speed may be higher when compared to a case in which the braking signal is transmitted to the four WCUs 122, 124, 126, and 128 using one bus lines.

That is, referring to FIG. 2, when the braking signal is transmitted to four WCUs 122, 124, 126, and 128 using one bus lines, since the braking signal is sequentially transmitted in order from the FL WCU 128, the braking signal, which is arrived at the RL WCU 128, may be transmitted at the latest. Accordingly, since the first bus line 150 and the second bus line 160 share and transmit the braking signals transmitted to the WCUs 120, when quick braking is required, for example, when an ABS operates, the braking signal may be more quickly transmitted to the WCUs 120.

Referring to FIG. 3C, the first braking signal 350 may be transmitted to the FL WCU 122, and the second braking signal 360 may be transmitted to the FR WCU 124, the RR WCU 126, and the RL WCU 128. In a situation in which any one of the WCUs is controlled extremely quickly, the present disclosure may be configured as in FIG. 3C.

In addition, the center ECU 110 may determine WCUs, to which the first braking signal 350 and the second braking signal 360 are to be transmitted, among the WCUs 122, 124, 126, and 128 according to a travel state of the vehicle and a state of the ground surface. For example, the determination of the WCUs, to which the first braking signal 350 and the second braking signal 360 are transmitted, may be changed continuously among the WCUs 122, 124, 126, and 128.

For example, whenever the ABS operates, the center ECU 110 may store data about the braking signals transmitted to the WCUs 122, 124, 126, and 128 and distribute the braking signals transmitted to the WCUs 122, 124, 126, and 128 using the stored data and a feedback system. Accordingly, using the travel state of the vehicle, the state of the ground surface, the data when the ABS operates, and the like, the center ECU 110 may determine which braking signals should be transmitted to which WCUs among the WCUs 122, 124, 126, and 128, and in this case, may determine a case, in which the braking signal may be transmitted the most quickly, to distribute the braking signals to the first bus line 150 and the second bus line 160.

Meanwhile, each of the first braking signal 350 and the second braking signal 360 may include an increase signal and/or a decrease signal, and the decrease signal may be transmitted to the WCU 120 prior to transmitting the increase signal. That is, the center ECU 110 may transmit the decrease signal to the plurality of WCUs 120 prior to transmitting the increase signal. For example, when each of the first braking signal 350 and the second braking signal 360 are transmitted to two WCUs, among the braking signals, a signal transmitted first may be the decrease signal.

When the ABS operates, the wheel, on which wheel lock occurs, requires quick control when compared to the other wheels, and particularly, securing rotation of the wheel by quickly decreasing a braking force is important. That is, decreasing the braking force is required to be performed more quickly than increasing the braking force, and thus the decrease signal may be transmitted to the WCU 120 prior to transmitting the increase signal.

In addition, when the decrease signal is transmitted to the front WCUs 122 and 124 and the rear WCUs 126 and 128 among the plurality of WCUs 120, the decrease signal may be preferentially transmitted to the rear WCUs 126 and 128. When a wheel lock phenomenon occurs on the rear wheel, there is a high probability that a more dangerous situation, that is, a situation in which the vehicle loses balance, occurs in terms of posture control when compared to a case in which a wheel lock phenomenon occurs on the front wheel. Accordingly, since the rear wheel needs to be controlled relatively more quickly, when the decrease signal should be transmitted to all of the front WCUs 122 and 124 and the rear WCUs 126 and 128, the decrease signal may be preferentially transmitted to the rear WCUs 126 and 128.

Meanwhile, the center ECU 110 may transmit the decrease signal to each of the plurality of WCUs 120 alternately using the first bus line 150 and the second bus line 160. For example, it may be configured that the WCUs 122, 124, 126, and 128, to which the first braking signal and the second braking signal are transmitted, are not changed for a predetermined time, and in this case, the decrease signal may be transmitted to each of the WCUs 122, 124, 126, and 128 alternately using the first bus line 150 and the second bus line 160 according to control of the center ECU 110.

In the case of a general braking situation, even when the ABS operates, since a case, in which the decrease signal is transmitted to three or more WCUs, hardly occurs, even when each of the first braking signal 350 and the second braking signal 360 is transmitted to two WCUs, a case, in which the decrease signal is delayed significantly, does not occur. In addition, when the WCUs 122, 124, 126, and 128, to which the first braking signal 350 and the second braking signal 360 are transmitted, are fixed, a method of transmitting the signal may be simplified.

Meanwhile, in FIG. 3, it is illustrated that the braking signals are transmitted to all of the WCUs 122, 124, 126, and 128, but the present disclosure is not necessarily limited thereto. That is, the braking signal may not be transmitted to the WCU which does not need to receive the braking signal.

The method of controlling the EMB according to one embodiment of the present disclosure is a method performed by the center ECU 110 electrically connected to the plurality of WCUs 120, which control the plurality of EMBs configured to brake the front wheels and rear wheels of the vehicle through at least two bus lines 150 and 160.

The center ECU 110 calculates slip ratios of the wheels. The plurality of braking signals 350 and 360 for controlling the plurality of EMBs are generated in the WCUs 120 on the basis of the calculated slip ratios. The generated plurality of braking signals 350 and 360 are transmitted to the plurality of WCUs 120 using at least two bus lines 150 and 160. In this case, the braking signals may be transmitted using the in-vehicle communication unit 114. In this case, at least one of the plurality of braking signals 350 and 360 may be transmitted to the plurality of WCUs 120 using the bus line different from the remaining bus line used for the remaining braking signal.

A process of transmitting the plurality of braking signals 350 and 360 may include a process of transmitting the first braking signal 350 to one front WCU and one rear WCU among the plurality of WCUs 120. In this case, the process of transmitting the plurality of braking signals 350 and 360 may include a process of transmitting the second braking signal 360 to the other front WCU and the other rear WCU among the plurality of WCUs 120.

Meanwhile, the process of transmitting the plurality of braking signals 350 and 360 may include a process of transmitting the first braking signal 350 to the front WCUs 122 and 124 among the plurality of WCUs 120 and a process of transmitting the second braking signal 360 to the rear WCUs 126 and 128 among the plurality of WCUs 120.

In addition, the process of transmitting the plurality of braking signals 350 and 360 may include a process of transmitting the decrease signal to the plurality of WCUs 120 prior to transmitting the increase signal. In this case, when the decrease signal is transmitted to the front WCUs 122 and 124 and the rear WCUs 126 and 128 among the plurality of WCUs 120, the decrease signal may be preferentially transmitted to the rear WCUs 126 and 128.

Accordingly, the plurality of EMBs generates braking forces corresponding to the braking signals according to control of the plurality of WCUs 122, 124, 126, and 128 which receive the first braking signal 350 and the second braking signal 360 described above.

According to one embodiment of the present disclosure, since a signal delay problem is solved while using the conventional CAN communication provided in the vehicle, there is an effect of securing stability of vehicle braking control including ABS control.

According to the present embodiment, there is an effect of securing stability of vehicle braking control including ABS control by solving a signal delay problem even using conventional CAN communication.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for controlling a plurality of electromechanical brakes (EMBs) configured to control, using a motor, braking of front wheels and rear wheels of a vehicle, the apparatus comprising:
a plurality of wheel control units (WCUs) configured to control the motor to cause the plurality of EMBs to generate a plurality of braking forces corresponding to a plurality of braking signals, respectively;
a center electronic control unit (ECU) configured to transmit the plurality of braking signals to the plurality of WCUs; and
a plurality of bus lines comprising first and second bus lines and extending between the center ECU and the plurality of WCUs,
wherein the center ECU is further configured to:
transmit, via the first bus line, at least one of the plurality of braking signals to at least one of the plurality of WCUs; and
transmit, via the second bus line, another braking signal or signals of the plurality of braking signals to another WCU or WCUs of the plurality of WCUs, and wherein:
the plurality of braking signals comprises a decrease signal instructing to decrease a braking force and an increase signal instructing to increase the braking force, and the center ECU is further configured to transmit the decrease signal to the plurality of WCUs prior to transmitting the increase signal to the plurality of WCUs.

2. The apparatus of claim 1, wherein:
the plurality of braking signals comprises first and second braking signals,
the plurality of WCUs comprises first and second front WCUs and first and second rear WCUs, and
the center ECU is further configured to:
transmit, via the first bus line, the first braking signal to the first front WCU and the first rear WCU; and
transmit, via the second bus line, the second braking signal to the second front WCU and the second rear WCU.

3. The apparatus of claim 1, wherein:
the plurality of braking signals comprises first and second braking signals,
the plurality of WCUs comprises a plurality of front WCUs and a plurality of rear WCUs, and
the center ECU is further configured to:
transmit, via the first bus line, the first braking signal to the plurality of front WCUs via the first bus line; and
transmit, via the second bus line, the second braking signal to the plurality of rear WCUs.

4. The apparatus of claim 1 wherein:
the plurality of WCUs comprises front and rear WCUs, and
the center ECU is further configured to transmit the decrease signal to the rear WCU prior to transmitting the decrease signal to the front WCU when the decrease signal is transmitted to the front and rear WCUs.

5. The apparatus of claim 1, wherein the center ECU is further configured to transmit the decrease signal to the plurality of WCUs alternatingly via the first and second bus lines.

6. A method performed by a center electric control unit (ECU) electrically connected to a plurality of wheel control units (WCUs) via a plurality of bus lines, the plurality WCUs configured to control a plurality of electro-mechanical brakes (EMBs) configured to control braking of front and rear wheels of a vehicle, the method comprising:
calculating a slip ratio of each of the front and rear wheels;
generating, based on the slip ratio of each of the front and rear wheels, a plurality of braking signals configured to control the plurality of EMBs; and
transmitting, via the plurality of bus lines, the plurality of braking signals to the plurality of WCUs,
wherein:
the plurality of bus lines comprises first and second bus lines, and at least one of the plurality of braking signals is transmitted via the first bus line, and at least one other of the plurality of braking signals is transmitted via the second bus line,
the plurality of braking signals comprises a decrease signal instructing to decrease a braking force and an increase signal instructing to increase the braking force, and
transmitting the plurality of braking signals to the plurality of WCUs comprises transmitting the decrease signal to the plurality of WCUs prior to transmitting the increase signal to the plurality of WCUs.

7. The method of claim 6, wherein:
the plurality of braking signals comprises first and second braking signals,
the plurality of WCUs comprises first and second front WCUs and first and second rear WCUs, and
transmitting the plurality of braking signals to the plurality of WCUs comprises:
transmitting the first braking signal to the first front WCU and the first rear WCU; and
transmitting the second braking signal to the second front WCU and the second rear WCU.

8. The method of claim 6, wherein:
the plurality of braking signals comprises first and second braking signals,
the plurality of WCUs comprises front and rear WCUs, and
transmitting the plurality of braking signals to the plurality of WCUs comprises:
transmitting the first braking signal to the front WCU; and
transmitting the second braking signal to the rear WCU.

9. The method of claim 6, wherein:
the plurality of WCUs comprises front and rear WCUs, and
transmitting the decrease signal to the plurality of WCUs comprises transmitting the decrease signal to the rear WCU prior to transmitting the increase signal to the front WCU when the decrease signal is transmitted to the front and rear WCUs.

* * * * *